United States Patent
Fu et al.

(10) Patent No.: US 7,035,045 B2
(45) Date of Patent: *Apr. 25, 2006

(54) BALANCE CLIP HOLDER FEATURE ON A SPINDLE MOTOR WITH NICKEL-TEFLON COATING ON BALANCE CLIPS FOR REDUCING FRICTION DURING CLIP ADJUSTMENT IN BALANCE PROCESS

(75) Inventors: Ta-Chang Fu, San Jose, CA (US); Andrew Keith Hanlon, San Jose, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 104 days.

This patent is subject to a terminal disclaimer.

(21) Appl. No.: 10/462,339

(22) Filed: Jun. 16, 2003

(65) Prior Publication Data

US 2004/0252409 A1    Dec. 16, 2004

(51) Int. Cl.
*G11B 17/02* (2006.01)

(52) U.S. Cl. .................................................. 360/99.08

(58) Field of Classification Search ............ 360/99.08, 360/98.07, 98.08, 99.04, 99.05, 99.09, 99.11–99.12; 369/75.21, 251, 254; 310/67 R
See application file for complete search history.

(56) References Cited

U.S. PATENT DOCUMENTS

| | | | |
|---|---|---|---|
| 4,003,265 A * | 1/1977 | Craig et al. .................... | 74/5 R |
| 5,278,709 A * | 1/1994 | Thornton et al. ......... | 360/97.01 |
| 5,555,144 A * | 9/1996 | Wood et al. ............. | 360/98.08 |
| 5,731,928 A * | 3/1998 | Jabbari et al. ........... | 360/98.08 |
| 6,178,063 B1 * | 1/2001 | Wood et al. ............. | 360/98.08 |
| 6,356,409 B1 * | 3/2002 | Price et al. .............. | 360/98.07 |
| 6,550,328 B1 * | 4/2003 | Horning et al. ................ | 73/468 |
| 6,594,109 B1 * | 7/2003 | Renken .................... | 360/98.08 |
| 6,608,733 B1 * | 8/2003 | Elsing ...................... | 360/99.08 |
| 6,624,968 B1 * | 9/2003 | Chessman et al. ........ | 360/99.12 |
| 6,760,188 B1 * | 7/2004 | Choo et al. .............. | 360/99.12 |
| 6,885,118 B1 * | 4/2005 | Fu et al. ........................ | 310/51 |

\* cited by examiner

*Primary Examiner*—Angel Castro
(74) *Attorney, Agent, or Firm*—Bracewell & Giuliani LLP

(57) ABSTRACT

A spindle motor is equipped with pre-installed adjustable balance clips on a stainless steel motor hub to facilitate better balance correction. A balance clip holder feature is formed in the hub and has grooves to hold the balance clips. The balance clip holder can be an integrally formed part of the hub, or it can be a separate piece that is assembled to the hub before the complete motor is assembled. In addition, the balance clips are provided with an improved coating to reduce friction during adjustment of the clips in the balance process. Each clip has a coating of nickel-Teflon to achieve a better coating quality and cleanliness over prior art designs. The nickel-Teflon combination yields unexpected results, such as a significantly smoother surface with more uniform coating thickness, and significantly less particle sloughing to reduce contamination.

14 Claims, 3 Drawing Sheets

BALANCE CLIP HOLDER FEATURE ON A SPINDLE MOTOR WITH NICKEL-TEFLON COATING ON BALANCE CLIPS FOR REDUCING FRICTION DURING CLIP ADJUSTMENT IN BALANCE PROCESS

BACKGROUND OF THE INVENTION

1. Technical Field

The present invention relates in general to an improved hard disk drive design and, in particular, to an improved design for a hard disk drive having a balance clip holder feature on the spindle motor with a stainless steel motor hub and a nickel-filled Teflon coating on the balance clips for reducing friction during clip adjustment in the disk pack balance process.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

During manufacturing of the hard disk drive, the subassembly of the spindle motor is fabricated and the disks are attached to a hub 11 (FIG. 8) of the spindle motor. In the prior art, the hubs 11 are formed from aluminum, and balance clips 13 are used in the hubs to fine-tune the balance of the hubs 11. As shown in FIG. 8, the balance clips 13 are retained on the hub 11 in balance clip holder features 15, which are typically integrally formed as part of the motor hub 11. The holder features 15 and, thus, balance clips 13 and radially spaced apart from each other which requires more radial space and a motor bracket with a large diameter. As a result, the area use efficiency of the printed circuit board is reduced. Although this design is workable, an improved design would be desirable.

SUMMARY OF THE INVENTION

One embodiment of a hard disk drive constructed in accordance with the present invention enables pre-installed, adjustable balance clips in a spindle motor design with a stainless steel motor hub to facilitate much improved disk pack balance correction. The present invention incorporates a balance clip holder feature into the stainless steel motor hub. The holder feature contains a plurality of grooves to hold the plurality of pre-installed balance clips. The balance clip holder can be an integrally formed part of the stainless steel motor hub, or it can be a separate piece that is assembled to the motor hub before the complete motor is assembled.

In addition, the balance clips are provided with an improved coating to reduce friction during adjustment of the clips in the disk pack balance process. Each clip has a layer or coating of nickel-filled or impregnated Teflon (nickel-Teflon). As a result, a better coating quality and cleanliness is achieved over prior art designs. The nickel-Teflon combination yields unexpected results, such as significantly reduced friction and reductions in contamination over prior art designs. The nickel-Teflon coating also has a significantly smoother surface with more uniform coating thickness, and significantly less deterioration or sloughing of particles from the coatings, thereby reducing contamination in the disk drive assembly.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
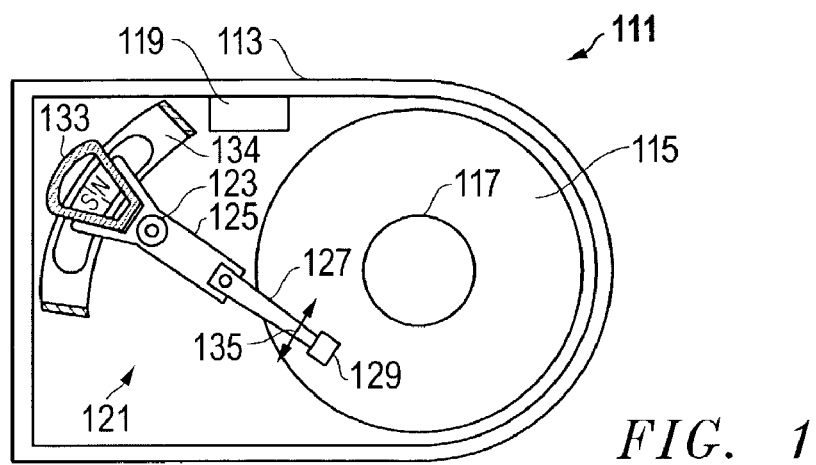
FIG. 1 is a schematic plan view of one embodiment of a hard disk drive constructed in accordance with the present invention.

Referring to FIG. 1, a schematic drawing of one embodiment of an information storage system comprising a magnetic hard disk file or drive 111 for a computer system is shown. Drive 111 has an outer housing or enclosure 113 containing at least one stacked, parallel magnetic disks 115 which are closely spaced apart. Disks 115 are rotated by a spindle motor assembly 116 (see FIG. 2) having a central drive hub 117. An actuator 121 comprises at least one actuator arm 125 in the form of a comb that is pivotally mounted to enclosure 113 about a pivot assembly 123. A controller 119 is also mounted to enclosure 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
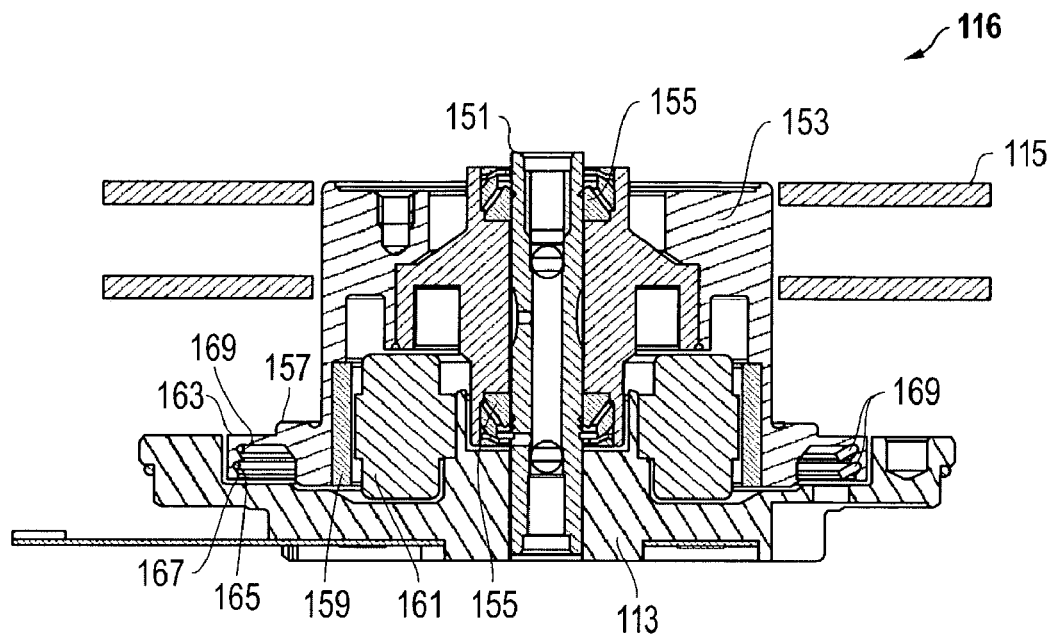
FIG. 2 is a sectional side view of one embodiment of a spindle motor design having an integral stainless steel motor hub with pre-installed adjustable balance clips.
Figure 3:
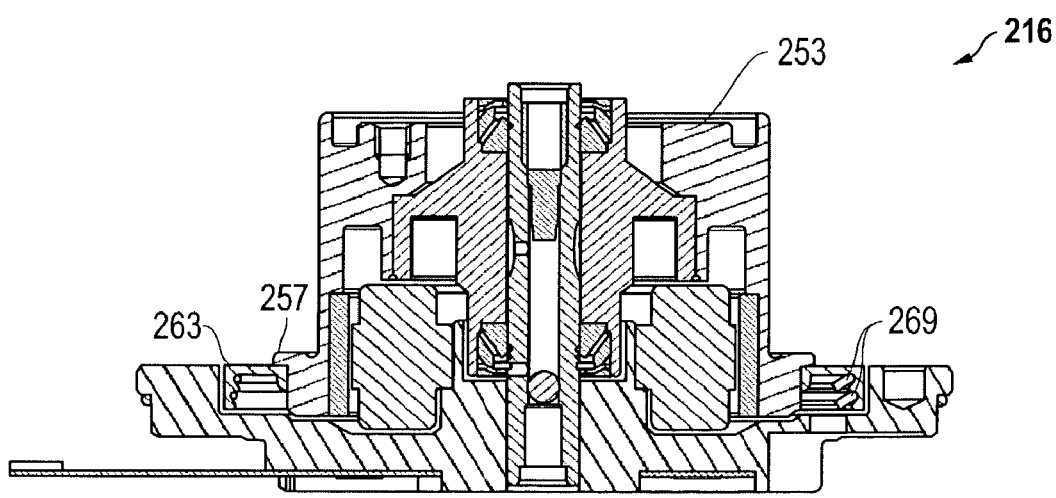
FIG. 3 is a sectional side view of another embodiment of a spindle motor design having a two-piece stainless steel motor hub with pre-installed adjustable balance clips.

Referring now to FIGS. 2 and 3, two embodiments of a spindle motor assembly 116, 216, respectively, of the drive 111 constructed in accordance with the present invention are shown. Spindle motor assemblies 116, 216 are similar and their differences will be described below. As stated, spindle motor assembly 116 (FIG. 2) forms a portion of the drive 111 for rotating the at least one disk 115 (two are shown). In the embodiment shown, the spindle motor assembly 116 has a shaft 151 mounted to the base or enclosure 113. A motor hub 153 is, in the embodiment shown, formed from stainless steel and mounted to the shaft 151 via bearings 155 for rotation relative to the shaft 151. The motor hub 153 also has an outer radial circumference 157 and a set of windings 159 for rotation relative to a stator 161 on the shaft 151.

In the embodiment shown, a balance clip holder 163 is located on the outer radial circumference 157 of the motor hub 116. The balance clip holder 163 has, in the present embodiment, at least one annular recess 165 (two shown) formed on an inner surface 167 thereof that circumscribe the motor hub 153. In contrast to prior art designs, the annular recesses 165 of the balance clip holder 163 are substantially radially aligned or "vertically stacked" in order to reduce the radial dimension of the hub. As shown in FIG. 2, balance clip holder 163 is integrally formed with the motor hub 153 from a single piece of material, such as stainless steel. However, as shown in FIG. 3, spindle motor assembly 216 may be manufactured such that the balance clip holder 263 is formed as a separate piece from the motor hub 253 and is assembled to the outer radial circumference 257 of the motor hub 253. The material of the balance clip holders 163, 263 may comprise, but is not limited to, stainless steel, aluminum, etc. Other than the balance clip holder being formed integrally with or separate from the motor hub, spindle motor assemblies 116 and 216 are identical in these two embodiments.

Figure 4:
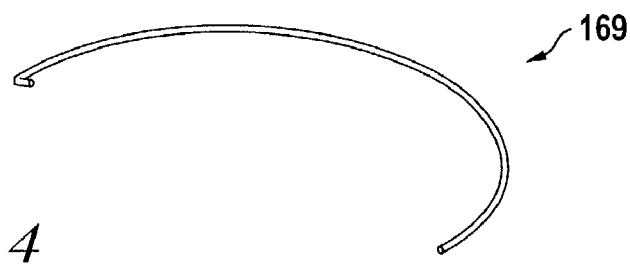
FIG. 4 is an isometric view of one embodiment of a balance clip constructed in accordance with the present invention.
Figure 8:
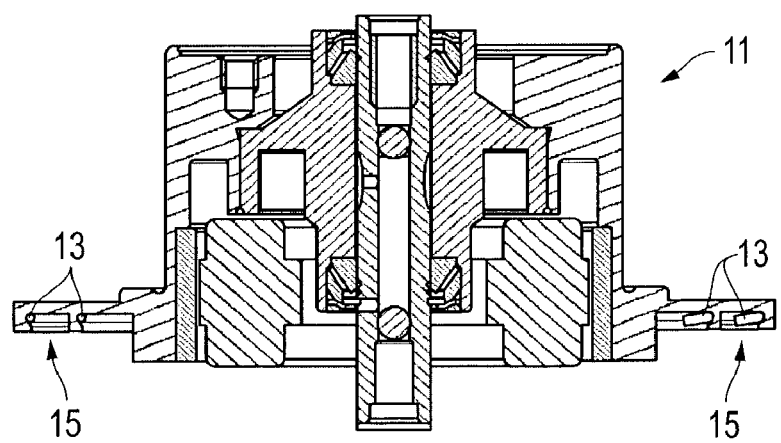
FIG. 8 is a sectional side view of a prior art motor hub.
Figure 6:
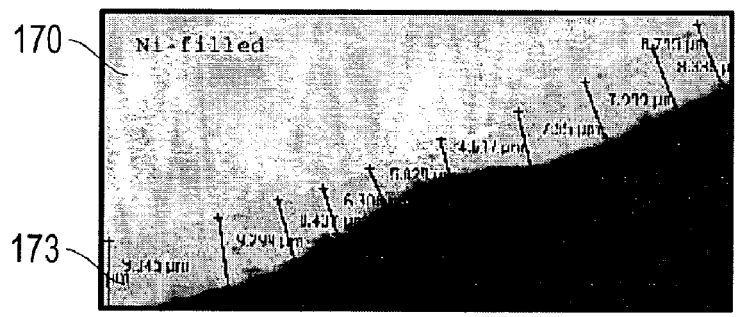
FIG. 6 is a highly magnified sectional view of the balance clip of FIG. 4, which is constructed in accordance with the present invention.
Figure 7:
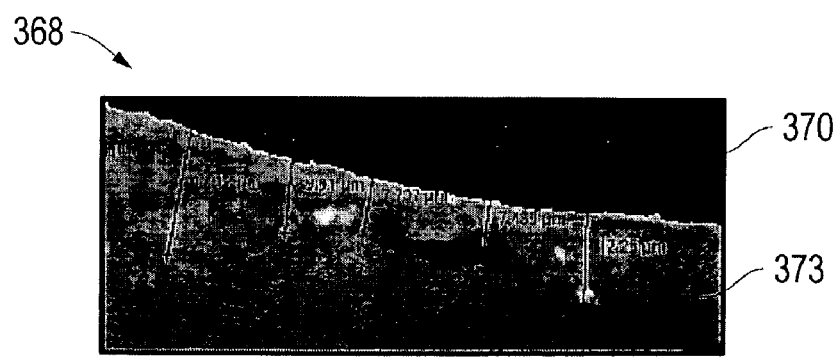
FIG. 7 is a highly magnified sectional view of the prior art balance clip of FIG. 5.

Referring again to FIG. 2, at least one annular balance clip 169 (two shown) is located in and slidably mounted to one of the annular recesses 165 in the balance clip holder 163 for adjustably balancing the motor hub 153 and the spindle motor assembly 116 for smooth rotation about the shaft 151 during the disk pack balance correction process. One embodiment of the balance clips 169 is shown in FIG. 4. In this version, the annular balance clip 169 has a circular cross-section with a bent tab on one end in order to facilitate the balance correction process. Alternatively, the balance clips 169 may comprise split-rings, if desired. In one embodiment, each of the annular balance clips 169 has an inner core 170 (FIG. 6) of, for example, stainless steel, a layer or coating 173 of nickel-filled or impregnated Teflon to reduce friction during adjustment of the annular balance clips 169 in the disk pack balance process. However, conventional balance clips 368 (FIG. 7) have an inner core 370 of base material and a coating 373 of only Teflon on an exterior of the inner core 370.

The present invention has several advantages, including the ability to provide a hard disk with pre-installed adjustable balance clips in a spindle motor with a stainless steel hub to facilitate better disk pack balance correction. The invention incorporates a balance clip holder feature into the stainless steel motor hub. The holder feature contains two grooves to hold the two pre-installed balance clips. The balance clip holder can be an integrally formed part of the hub, or it can be a separate piece that is assembled to the motor hub before the complete motor is assembled.

Figure 5:
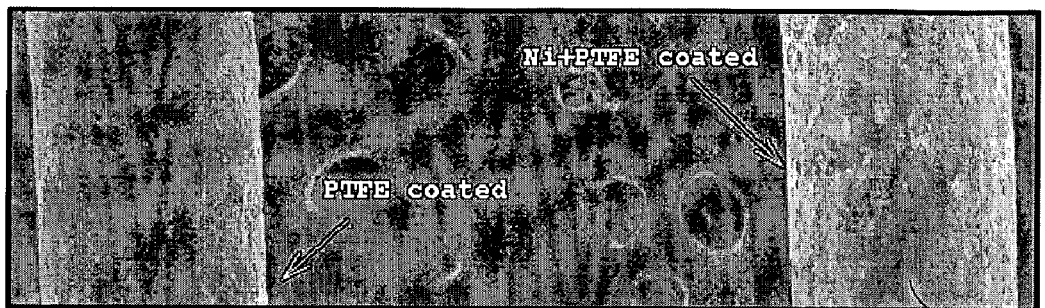
FIG. 5 is a highly magnified top view of surfaces of, on the left, a prior art balance clip and, on the right, the balance clip of FIG. 4, which is constructed in accordance with the present invention.

In addition, the balance clips are provided with an improved coating to reduce friction and contamination during adjustment of the clips in the disk pack balance process. Each clip has a special nickel-filled Teflon coating. As a result, a better coating quality and cleanliness is achieved over prior art designs. The nickel-Teflon combination yields unexpected results, such as a significantly smoother surface with more uniform coating thickness (compare FIGS. 6 and 7), and significantly less deterioration or sloughing of particles from the coating (compare prior art left side and present invention right sides of FIG. 5), thereby reducing contamination in the disk drive assembly.

While the invention has been shown or described in only some of its forms, it should be apparent to those skilled in the art that it is not so limited, but is susceptible to various changes without departing from the scope of the invention.

What is claimed is:

1. A spindle motor, comprising:
   a base;
   a shaft mounted to the base and having an axis;

a motor hub mounted to the shaft via bearings for rotation relative to the shaft, the motor hub having a single balance clip holder formed therein at only one axial end of the motor hub, the balance clip holder having at least two holder features that are substantially radially aligned with each other relative to the axis of the shaft; and a balance clip located in the balance clip holder for adjustably balancing the motor hub for smooth rotation about the shaft during a disk pack balance process.

2. The spindle motor of claim 1, wherein the holder features comprise grooves, and the balance clip comprises a plurality of balance clips, each of which is axially spaced apart from the others and installed in one of the grooves.

3. The spindle motor of claim 1, wherein the balance clip holder is integrally formed with the motor hub from a single piece of stainless steel.

4. The spindle motor of claim 1, wherein the balance clip holder is formed as a separate piece from the motor hub and is assembled to the motor hub.

5. A spindle motor, comprising:
a base;
a shaft mounted to the base and having an axis;
a motor hub formed from stainless steel and mounted to the shaft via bearings for rotation relative to the shaft, the motor hub having a single balance clip holder formed therein at one axial end of the motor hub, the balance clip holder having at least two holder features that are substantially radially aligned with each other relative to the axis of the shaft and axially spaced apart from each other;
a balance clip located in the balance clip holder for adjustably balancing the motor hub for smooth rotation about the shaft during a disk pack balance process, the balance clip being coated with a layer of nickel-filled Teflon to reduce friction during adjustment of the balance clip in the disk pack balance process.

6. A hard disk drive, comprising:
an enclosure;
a spindle motor having a shaft with an axis mounted to the enclosure, a motor hub mounted to the shaft via bearings for rotation relative to the shaft, the motor hub having a single balance clip holder with recesses formed therein at only one axial end of the motor hub, the recesses being substantially radially aligned with each other relative to the axis of the shaft and axially spaced apart from each other;
a balance clip located in and slidably mounted to the balance clip holder for adjustably balancing the motor hub for smooth rotation about the shaft during a disk pack balance process;
at least one media storage disk mounted to the motor hub for rotation therewith; and
an actuator mounted to the enclosure, the actuator having a head gimbal assembly extending therefrom for movement relative to said at least one media storage disk, and the head gimbal assembly having a read/write head for reading data from and writing data to said at least one media storage disk.

7. The hard disk drive of claim 6, wherein the balance clip holder has a plurality of annular recesses formed therein that circumscribe the motor hub, and the balance clip comprises a plurality of annular balance clips, each of which is located in and slidably mounted to one of said plurality of recesses.

8. The hard disk drive of claim 6, wherein the balance clip holder is integrally formed with the motor hub from a single piece of stainless steel.

9. The hard disk drive of claim 6, wherein the balance clip holder is formed as a separate piece from the motor hub and is assembled to an outer radial circumference of the motor hub.

10. A hard disk drive, comprising:
an enclosure;
a spindle motor having a shaft with an axis mounted to the enclosure, a motor hub formed from stainless steel and mounted to the shaft via bearings for rotation relative to the shaft, the motor hub having a balance clip holder with recesses formed therein, the recesses being substantially radially aligned with each other relative to the axis of the shaft; a balance clip located in and slidably mounted to the balance clip holder for adjustably balancing the motor hub for smooth rotation about the shaft during a disk pack balance process, the balance clip being coated with a layer of nickel-filled Teflon to reduce friction during adjustment of the balance clip in a disk pack balance process;
at least one media storage disk mounted to the motor hub for rotation therewith; and
an actuator mounted to the enclosure, the actuator having a head gimbal assembly extending therefrom for movement relative to said at least one media storage disk, and the head gimbal assembly having a read/write head for reading data from and writing data to said at least one media storage disk.

11. A hard disk drive, comprising:
an enclosure;
a spindle motor having a shaft mounted to the enclosure, a motor hub formed from stainless steel and mounted to the shaft via bearings for rotation relative to the shaft, and the motor hub having an outer radial circumference;
a balance clip holder on the outer radial circumference of the motor hub, the balance clip holder having a pair of annular recesses formed on an inner surface thereof that circumscribe the motor hub;
a pair of annular balance clips, each of which is located in and slidably mounted to one of the annular recesses in the balance clip holder for adjustably balancing the motor hub for smooth rotation about the shaft during a disk pack balance correction process, each of the annular balance clips having a coating of nickel-filled Teflon to reduce friction during adjustment of the annular balance clips in the disk pack balance correction process;
a plurality of media storage disks mounted to the motor hub for rotation therewith; and
an actuator mounted to the enclosure, the actuator having a plurality of head gimbal assemblies extending therefrom for movement relative to the media storage disks, each of the head gimbal assemblies having a read/write head for reading data from and writing data to the media storage disks.

12. The hard disk drive of claim 11, wherein the balance clip holder is integrally formed with the motor hub from a single piece of stainless steel.

13. The hard disk drive of claim 11, wherein the balance clip holder is formed as a separate piece from the motor hub and is assembled to the outer radial circumference of the motor hub.

14. The hard disk drive of claim 11, wherein the pair of annular recesses are substantially radially aligned with each other relative to an axis of the shaft.

* * * * *

UNITED STATES PATENT AND TRADEMARK OFFICE
Certificate

Patent No. 7,035,045 B2                                                  Patented: April 25, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ta-Chang Fu, San Jose, CA (US); Andrew Keith Hanlon, San Jose, CA (US); Stanley Yen Wong, San Jose, CA (US); and Tisha Jefferson, Greensboro, NC (US).

Signed and Sealed this Thirteenth Day of November 2012.

MOHAMMAD GHAYOUR
*Supervisory Patent Examiner*
Art Unit 2687
Technology Center 2600